United States Patent
Nasser et al.

(10) Patent No.: US 11,072,697 B2
(45) Date of Patent: Jul. 27, 2021

(54) INJECTABLE POLYMER COMPOSITION, SHOE STRIP AND METHOD OF MANUFACTURE

(71) Applicants: Sidnei Winston Nasser, São Paulo (BR); Jorge Luis Cambrilha Araújo, Crato (BR)

(72) Inventors: Sidnei Winston Nasser, São Paulo (BR); Jorge Luis Cambrilha Araújo, Crato (BR)

(*) Notice: Subject to any disclaimer, the term of this patent is extended or adjusted under 35 U.S.C. 154(b) by 0 days.

(21) Appl. No.: 16/263,866

(22) Filed: Jan. 31, 2019

(65) Prior Publication Data

US 2019/0233629 A1     Aug. 1, 2019

(30) Foreign Application Priority Data

Jan. 31, 2018 (BR) .................. 10 2018 002096-0
Jul. 16, 2018 (BR) .................. 10 2018 014526-6

(51) Int. Cl.
| | |
|---|---|
| C08L 23/08 | (2006.01) |
| C08L 21/00 | (2006.01) |
| B29C 45/00 | (2006.01) |
| B29K 21/00 | (2006.01) |
| B29K 23/00 | (2006.01) |
| A43B 3/12 | (2006.01) |
| B29K 105/26 | (2006.01) |
| B29K 105/00 | (2006.01) |
| B29L 31/50 | (2006.01) |

(52) U.S. Cl.
CPC ...... *C08L 23/0853* (2013.01); *B29C 45/0001* (2013.01); *C08L 21/00* (2013.01); *C08L 23/0815* (2013.01); *A43B 3/12* (2013.01); *B29K 2021/00* (2013.01); *B29K 2023/083* (2013.01); *B29K 2105/0088* (2013.01); *B29K 2105/26* (2013.01); *B29L 2031/50* (2013.01); *C08L 2205/03* (2013.01); *C08L 2205/035* (2013.01)

(58) Field of Classification Search
CPC ... C08L 23/0815; C08L 23/0853; C08L 21/00
See application file for complete search history.

(56) References Cited

U.S. PATENT DOCUMENTS

| | | |
|---|---|---|
| 5,157,082 A | 10/1992 | Johnson |
| 9,441,099 B2 | 9/2016 | Rakhman |
| 2013/0253123 A1 | 9/2013 | Rakhman |
| 2016/0194487 A1 | 7/2016 | Weaver et al. |
| 2018/0094129 A1* | 4/2018 | Baghdadi .............. C08L 53/025 |

FOREIGN PATENT DOCUMENTS

| | | |
|---|---|---|
| BR | 10 2012 025160 4 | 11/2013 |
| CN | 104540893 | 4/2015 |
| WO | WO-2005/073307 | 8/2005 |

* cited by examiner

*Primary Examiner* — Edward J Cain
(74) *Attorney, Agent, or Firm* — B. Aaron Schulman, Esq.; Stites & Harbison, PLLC

(57) ABSTRACT

A polymeric composition which can be used for the manufacture of rubber articles, in general, such as soles, shoes, boots, sealing rings, rugs, footwear straps and sandals, by the same thermoplastic injection process in equipment (injectors) used for plastics without the need for vulcanization or crosslinking and with different embodiments, according to the final product of interest. The basic components of the present polymeric composition are ethylene vinyl acetate, which may be a combination of ethylene vinyl acetate having a VA content of 19% and ethylene vinyl acetate having a VA content of 28%, and a copolymer of alpha olefin ethylene.

10 Claims, No Drawings

INJECTABLE POLYMER COMPOSITION, SHOE STRIP AND METHOD OF MANUFACTURE

FIELD OF THE INVENTION

The present invention refers to a polymeric composition that can be used to produce articles, such as components for footwear, footwear straps, sandal-type footwear, shoe soles, sealing rings, carpets, auto parts, chicken pluckers, and other artifacts usually made of rubber. The polymer composition can be subjected to injection processes identical to the thermoplastic materials' processes and the polymeric composition is not cross-linked and can be injected in solid or expanded form.

BACKGROUND OF THE INVENTION

Several polymeric compositions are known from the prior art, which have their applications and properties varied according to the elements that compose the polymeric compositions and their respective amounts.

In this regard, the characteristics of a polymeric composition are strongly influenced and altered by the elements forming said composition. Thus, the qualitative and quantitative aspects of the elements that form a polymeric composition are essential to discuss the applications and properties of such composition, since slight changes in component quantities, for example, may be responsible for significant variations of their properties and applications.

Among the various polymeric compositions known in the state of the art are the elastomeric composition described by the Brazilian document BR 10 2012 025160 4, which consists of a composition formed by a copolymer of ethylene and vinyl acetate, comprising from 20% to 90% %, by mass, of the composition; from 5% to 60% of an elastomeric polyolefin; between 0.1% and 10% of a polyorganosiloxane and at least one plasticizer in proportions between 0.5% and 20% by weight.

Document WO2012/073242 discloses a composition for an olefinic elastomeric thermoplastic comprising GTR rubber strips, at least one polyolefin, at least one α-olefin-vinyl ester type copolymer and at least one block styrene copolymer. The composition further comprises sulfur removing element, such as thiazole and guanidines.

Document US2016194487, in turn, refers to a polymeric blend composed by the bond between an ethylene/α-olefin group copolymer and a propylene/ethylene type copolymer and a quantity of ethylene-vinyl acetate copolymer less than 40% by weight.

Document WO2005/073307 discloses a thermoplastic polymeric composition comprising powdered rubber in the particulate form, from scraps of other processes or products, a thermoplastic selected from the group of polyethylenes or polyurethanes and a dispersing agent, such as: PE, EVA, EMA, EBA, PE, GMA and MAH, with EVA being the preferred agent. In addition, said reference composition further comprises fibers with low water content and their formulation allows the processing to be done in the cold.

The thermoplastic composition described by U.S. Pat. No. 5,157,082 is formed of vulcanized and particulate rubber, a polyolefin resin selected from the groups PE, PP, polybutadiene or mixtures, and at least one olefin copolymer. In addition, the polymeric composition described herein comprises talc, plasticizers, silica, pigments, oxidizing agents and other additives, depending on the properties expected of the material.

Finally, CN104540893 relates to a polymeric composition composed of the union of a thermoplastic polyester elastomer and a copolymer of α-olefin and vinyl acetate, wherein the VA units may be between 3% and 50%. Said polymeric composition can be used for different purposes, such as: making medical tubes, covers for mobile phones, cables.

Even with the availability of polymeric compositions already known in the art, challenges still remain in the manufacture of certain artifacts of polymeric material, especially when there are specific needs for the injection process.

An example of an artifact with specific manufacturing needs is the case of footwear, and especially of flip-flop sandals.

In flip-flop sandals, the sole is made of rubber or plastic and the straps of polymer material, usually PVC—polyvinyl polychloride.

In the usual manufacturing process, the sole raw material is transformed into a vulcanized and stabilized pressed web which is subsequently cut. The material is cut according to the desired model and size and, if applicable, the material can be printed by an ink transfer process (printing, screen printing, etc.). Then the sole receives the straps, finishing the sandal. In other known processes, a thermoplastic compound is injected to form the sole.

Sandal straps are a particularly delicate component of finger sandals. On the one hand, the straps need to be tough and durable, but on the other hand they have to be low in cost and suitable for the injection process.

The material commonly selected for straps, PVC, has proved to be problematic, mainly from the point of view of safety and the environment.

The PVC needs a plasticizer that flexibilizes the material, and the most used plasticizer is DEHP. This substance, a phthalate, is highly toxic, posing a risk of toxicity to the user of the manufactured article or even the contamination of the environment. In addition, the provision of PVC is often a problem, as incineration of the material would lead to the release of dioxins.

Thus, it remains in the state of art the need for a material that can replace PVC in the manufacture of footwear, and especially in the manufacture of straps of flip-flop sandals.

Other examples of articles with specific manufacturing needs are those articles that need additives to modulate the physical and chemical characteristics of the material and are formed by an injection process. Among these articles are footwear soles, but also various artifacts such as sealing rings, carpets, auto parts and chicken pluckers.

Typically, such type of article is either made of rubber or uses polymeric compositions that require high energy consumption.

Thus, there is also a need for the development of polymeric compositions which can be subjected to simplified injection processes, where the composition can be cold injected, in solid or expanded form.

SUMMARY OF THE INVENTION

It is an object of the present invention to provide a composition suitable for the manufacture of straps of flip-flop sandals.

It is a further object of the present invention to provide a composition suitable for the manufacture of straps of flip-flop sandals which is non-toxic.

It is another object of the present invention to provide a composition suitable for the manufacture of straps of flip-flop sandals which can be injected into conventional PVC and other thermoplastic injectors.

It is a further object of the present invention to provide a composition suitable for the manufacture of straps of flip-flop sandals which does not exhibit shrinkage during the kiln drying process.

It is still another object of the present invention to provide a composition suitable for the manufacture of straps of flip-flop sandals which does not require plasticizers, stabilizers or antioxidants.

It is a further object of the present invention to provide a composition for the manufacture of straps of flip-flop sandals that do not get yellow by oxidation.

It is another object of the present invention to provide a composition suitable for the manufacture of straps of flip-flop sandals having a density (crystal composition) 30% lower than the Crystal PVC compound.

It is still another object of the present invention to provide a composition suitable for the manufacture of flip-flop sandal straps having high resiliency, high mechanical tensile strength, flexural strength and elongation properties.

The present invention also aims to provide a flip-flop sandal strap having high resilience, high mechanical tensile strength, flexural strength and elongation properties.

It is another object of the invention to provide a flip-flop sandal strap which can be manufactured in a simpler and more efficient process.

It is a further object of the invention to provide a flip-flop sandal strap fabric manufacturing process utilizing conventional PVC injectors.

It is yet another object of the present invention to provide a composition suitable for the manufacture of rubber articles, in general, such as: components for footwear, shoe soles, sealing rings, carpets, auto parts, chicken pluckers, and the like artifacts usually made of rubber.

It is another object of the present invention to provide a polymeric composition which can be injected into conventional thermoplastic injectors, such an injection process occurring with the cold mold.

It is a further object of the present invention to provide a composition which comprises discards from the production process itself so as to generate a completely sustainable composition, and of which the manufacturing process is not responsible for the generation of waste to be discarded.

It is another object of the present invention to provide a composition suitable for manufacturing manufactured articles having a density of up to 30% less than the PVC and TPU compound.

It is yet another object of the present invention to provide a polymeric composition having high resilience, flexural strength and elongation, abrasion resistance, chemical resistance, low temperature resistance, Grip resistance, low density and the possibility of obtaining high Shore A hardnesses.

It is another object of the invention to provide a polymeric composition which can be manufactured in a simpler, more efficient and economical process, enabling full reuse of the materials used in the production process of the polymeric composition of the present invention.

DETAILED DESCRIPTION OF THE INVENTION

The present invention achieves these and other objects through a polymeric composition comprising from 3% to 75% by weight of a copolymer of alpha olefin of from 10% to 60% by weight of ethylene vinyl acetate, wherein the ethylene vinyl acetate may comprise a combination of ethylene vinyl acetate having a VA content below 20% and ethylene vinyl acetate having a VA content above 25%.

These compositions further comprise additional elements which vary according to the applications cited in this report.

In view of the foregoing, in relation to straps and soles of footwear and sandals, the present invention achieves the above objects by means of an injectable polymeric composition for the manufacture of sandal straps comprising from 50% to 75% by weight, of ethylene alpha-olefin copolymer; and from 25% to 50% by weight of ethylene vinyl acetate. Furthermore, for this embodiment of the invention, the composition may further comprise up to 15% by weight of a polyolefin elastomer, and the amount by weight of ethylene alpha-olefin copolymer is preferably between 60% and 70%.

Thus, by utilizing the composition for manufacturing footwear straps, the present invention provides a flip-flop sandal strap which is manufactured by the injection of a polymeric composition comprising from 50% to 75% by weight of copolymer of alpha olefin ethylene; and from 25% to 50% by weight of ethylene vinyl acetate. Preferably, the composition comprises alpha-olefin copolymer ethylene, ethylene vinyl acetate (EVA) having a vinyl acetate concentration below 20% and ethylene vinyl acetate (EVA) having a vinyl acetate concentration above 25%.

In this regard, ethylene vinyl acetate (EVA) having a vinyl acetate concentration below 20% is preferably an ethylene vinyl acetate (EVA) with VA content (vinyl acetate concentration) of 19%, the composition preferably comprising from 5 to 10% EVA with 19% VA.

The ethylene vinyl acetate (EVA) having a vinyl acetate concentration of above 25% is preferably an ethylene vinyl acetate (EVA) with VA content (vinyl acetate concentration) of 28%, preferably the composition having, by weight, from 20 to 30% EVA with 28% VA.

Optionally, the composition may further comprise up to 15% by weight of a polyolefin elastomer. The elastomer may be ENGAGE® manufactured by Dow.

In relation to the second embodiment of the present invention, directed to the other rubber articles in general, which are obtained by cold injection of the present polymeric composition, the present invention comprises a cold injectable polymeric composition for the manufacture of rubber articles, in general, comprising from 3% to 20% by weight of ethylene alpha-olefin copolymer; from 10% to 30% by weight of virgin ethylene vinyl acetate; between 20% and 60% rubber powder vulcanized or non-vulcanized; and between 20% and 30% of expanded ethylene vinyl acetate derived from the discards of the manufacturing process of injected articles or plates.

According to this embodiment, the ethylene vinyl acetate comprises ethylene vinyl acetate having a VA content below 20% and ethylene vinyl acetate having a VA content above 25%.

The EVAs may comprise from 5% to 30% of ethylene vinyl acetate with a VA content of 19%, and from 5% to 30% of ethylene vinyl acetate with a VA content of 28%.

The composition may further comprise flow aid agents in an amount of up to 2% and homogenizing agents, up to 2% by weight of said composition.

The present invention also contemplates rubber artifacts, in general, which are fabricated by the cold injection of a polymeric composition comprising from 3% to 20% by weight of ethylene alpha-olefin copolymer; between 20 and 60% rubber powder vulcanized or non-vulcanized; and from 20% to 30% by weight of ethylene vinyl acetate, wherein this crosslinked element is expanded and fully reused in the production process of said composition.

The present invention also contemplates a method for manufacturing a rubber artifact comprising injecting a polymeric composition comprising: from 3% to 20% by weight of ethylene alpha-olefin copolymer; between 20 and 60% rubber powder vulcanized or non-vulcanized; and from 10% to 30% by weight of ethylene vinyl acetate.

In the method of the second embodiment of the present invention, the polymeric composition comprises: 5 to 30% ethylene vinyl acetate with VA content of 19%, 5% to 30% ethylene vinyl acetate with VA content of 28%, from 3% to 20%, by weight, of ethylene alpha-olefin copolymer; and up to 60% by weight of a powdered rubber.

In the method of the present invention, the polymeric composition, after pelleting in extruders or knife mills, is injected into systems used for injection of thermoplastics, said injection process being carried out in the cold mold. The cold mold may be at a temperature between 10° C. and 25° C.

Further, in the method of the present invention, all the remaining compound of the production process is fed back into the process, there being no loss and/or disposal of said material.

The present invention relates to a polymeric composition that can be used to manufacture articles such as: components for footwear (especially footwear and sandals), shoe soles, sealing rings, carpets, auto parts, chicken pluckers, or other artifacts usually made of rubber; and a method of manufacturing such articles.

The polymeric composition of the present invention is not cross-linked or subjected to chemical reactions during its formation.

The composition of the present invention preferably comprises as main basic elements a copolymer of alpha olefin ethylene and an ethylene vinyl acetate (EVA) having a vinyl acetate concentration below 20% and an ethylene vinyl acetate (EVA) having a concentration of vinyl acetate content greater than 25%.

According to the first embodiment of the present invention, which is for the production of articles of sandals and shoes, such as straps, the ethylene vinyl acetate (EVA) with a vinyl acetate concentration below 20% is preferably ethylene vinyl acetate (EVA) having a VA content (vinyl acetate concentration) of 19%, the composition preferably having from 5 to 10% EVA with 19% VA.

The ethylene vinyl acetate (EVA) having a vinyl acetate concentration of above 25% is preferably an ethylene vinyl acetate (EVA) having a VA content (vinyl acetate concentration) of 28%. Preferably, the composition comprises 20 to 30% EVA with 28% VA by weight.

The ethylene alpha-olefin copolymer may be the substance TAFMER® DF710, manufactured by Mitsui Chemicals, Inc.

The amount by weight of TAFMER® DF710 in the first embodiment of said composition is between 50% and 75%, preferably between 60% and 70%.

Optionally, the composition may further comprise up to 15% by weight of a polyolefin elastomer. The elastomer may be ENGAGE® manufactured by Dow.

Thus, the composition of the first embodiment of the present invention is an injectable composition, high resilience, high mechanical property of tensile strength, flexural strength and elongation, wherein the composition can be injected at a temperature from 140° C.

Thus, for the manufacture of a flip-flop sandal strap, the composition of the present invention may be injected in the same molds and injectors commonly used for the PVC injection processes, but the process may be carried out with a lower temperature. As the composition does not undergo any shrinkage, the process can be performed more accurately, since no mold or cut adaptation is required.

The sandal strap fabricated with the composition of the present invention is resistant without being brittle, and is not yellowed due to oxidation.

Furthermore, the strap is completely non-toxic, which eliminates user risk and facilitates handling of discards, materials and straps discarded.

Example 1

In an exemplifying composition of the first embodiment of the present invention, the injectable polymeric composition comprises:

7 kg Ethylene Alpha-Oleic Copolymer (TAFMER® DF710);

3 kg of Ethylene Vinyl Acetate; and 1 kg of Polyolefin Elastomer (ENGAGE®).

According to the second embodiment of the present invention, focused on the production of rubber articles, in general, in addition to the main compounds (copolymer of alpha-olefin ethylene, ethylene-vinyl acetate (EVA) with vinyl acetate concentration below 20% and ethylene vinyl acetate (EVA) with vinyl acetate concentration above 25%), the composition further comprises the presence of powdered vulcanized rubber.

As in the first embodiment, the alpha olefin ethylene copolymer may be the substance TAFMER® DF710, manufactured by Mitsui Chemicals, Inc.

The amount by weight of TAFMER® DF710 in the composition of the second embodiment is between 3% and 20%, preferably between 3 and 10% and still more preferably 5%, by weight.

The ethylene vinyl acetate (EVA) with a vinyl acetate concentration below 20% is preferably an ethylene vinyl acetate (EVA) with VA content (concentration of vinyl acetate units) of 19%. Preferably, the composition has between 5 and 30% EVA with 19% VA.

The ethylene vinyl acetate (EVA) having a vinyl acetate concentration of above 25% is preferably an ethylene vinyl acetate (EVA) with VA content (concentration of vinyl acetate units) of 28%. Preferably, the composition has between 5 and 30% EVA with 28% VA.

Rubber powder, vulcanized or non-vulcanized, used in the 20-60% range may be SBR, NR, NBR, EPDM, CR, FKM, ECO, HNBR, BR and IR rubbers. The addition of rubber to the composition gives the material the characteristics of rubberiness, elasticity, resilience, Grip (adhesion to the substrate) and abrasion.

Optionally, said composition may further comprise flow assistants and homogenizing agents which aid in the injection process of the polymeric composition of the present invention.

Preferably, up to 2% by weight of flow aid and up to 2% by weight of homogenizing agent are added to the composition. However, these amounts may range from 1% to 6%.

In this regard, although various flow aiding and homogenizing agents may be used, the use of the FLUXTEC component 32 as a flow aid, produced and marketed by Proquitec Indústria, Distribuição e Representação, is preferred, as is the use of the HOMOGETEC MTC as a homogenizing agent—also produced and marketed by Proquitec.

Further, depending on the intended use for said polymeric composition and the desired mechanical properties, plasticizers and additives, such as paraffinic or naphthenic oil, may be added to the composition.

The second embodiment of the polymeric composition of the present invention, formed by the elements described above, has advantageous properties against the polymeric compositions, since it has a low specific weight (up to 30% lower than PVC/TPU), as well as: high resilience, flexural strength and elongation, abrasion resistance, chemical resistance, low temperature resistance, Grip resistance, low density and the possibility of obtaining high Shore A hardness.

Thus, for the manufacture of rubber articles, generally made of the polymeric composition of the present invention, the composition of the present invention may be injected in the same molds with injectors commonly used for the thermoplastic injection processes, wherein the injection procedure can be carried out with a temperature of 140° C., lower when compared to other thermoplastics, which brings process savings and ease of processing.

Furthermore, in the second embodiment of the present invention, the polymeric composition, after pelleting in extruders or knife mills, is injected into systems used for injection of thermoplastics, said injection process being carried out in the cold mold.

Since the composition does not undergo any shrinkage, the process can be performed more accurately, since mold adaptation is not required for contraction, as is the case for other elastomeric or thermoplastic compounds.

In this regard, the method of producing rubber artifacts, in general, made from the polymeric composition of the present invention consists in adding the forming elements of the composition, i.e. the ethylene alpha-olefin copolymer, the ethylene-ethyl acetate vinyl rubber and vulcanized rubber powder in the proportions described above together with flow assistants, homogenizing agents and optionally additives as plasticizers in rubber mixing equipment which may be Bambury or Kneader type.

After the forming components of said polymeric composition are suitably added to the mixing equipment, the complete mixing of the materials is promoted within a maximum of 5 minutes, and the material is then pelleted in an apparatus such as an extruder or as a knife mill. Naturally, pelletizing may alternatively use other suitable equipment.

Once pelletized, the pellets of said polymeric composition are injected into conventional thermoplastic injectors, the injection process being carried out in cold molds, between temperatures of 10° C. to 25° C., the injection being performed in an agile, viable and energy efficient manner, so that the average injection time is similar to known thermoplastics, such as: PVC, TR, TPE, TPU and TPV.

One of the advantages associated with the method of the present invention is the possibility of full use of the discard of the process products, such as: injection channel materials, damaged parts materials, burrs and other scrap. This waste can be crushed and re-injected, without the need for thermal or chemical treatments and without the addition of virgin compound. Thus, the raw material can be fully reused, so that the process of producing rubber articles made of the polymeric composition of the present invention does not generate waste, which makes the products sustainable.

Rubber artifacts manufactured from the composition of the present invention are resistant without becoming brittle, and do not suffer yellowing due to oxidation.

Example 2

In an exemplifying composition of the second embodiment of the present invention, the injectable polymeric composition comprises: EVA 19% 10 wt %, EVA 25% 15 wt %, Ethylene alpha olefin copolymer 5 wt %, Crosslinked expanded EVA residue 20 wt %, Vulcanized Rubber Powder 40 wt %, Process Auxiliary 3% by weight, Homogenizing Agent 2% by weight and Plasticizer Paraffin Oil 5% by weight.

Elastomeric compounds in cold molds having a hardness of up to 90 Shore A, low density 0.98 g/cm$^3$ in solid products, or 0.60 g/cm$^3$ in expanded products, abrasion of 200 mm are obtained with the present invention (standard DIN 53516), 400% Elongation, Low Temperature Resistance (−35° C.), High Resilience (45%) for compounds with 80 Shore A Hardness.

Example 3

In a second exemplary composition of the second embodiment of the present invention, the injectable polymeric composition comprises: EVA 25% VA 15% by weight, EVA 19% 10% by weight, TAFMER DF710 5% by weight, 20% by weight expanded EVA residue, 41.5% vulcanized rubber powder, 2.0% FLUXTEC 32 process aid, 1.5% MTC Homogenizer and 5% paraffinic oil.

This second exemplary composition of the present invention forms injectable elastomeric compounds in cold molds having a hardness of up to 65 Shore A points, low density 0.98 g/cm$^3$ in solid products, or 0.60 g/cm$^3$ in expanded products, 200 mm abrasion (DIN 53,516), 280% Elongation, Low Temperature Resistance (−35° C.), High Resilience (44%), Burst Voltage (ASTM D412) 28 kgf/cm$^2$.

Having described examples of preferred embodiments of the present invention, it should be understood that the scope of the present invention encompasses other possible variations of the inventive concept described, being limited only by the content of the claims, including possible equivalents thereto.

The invention claimed is:

1. An injectable polymeric composition comprising:
   from 3% to 75% by weight of ethylene alpha-olefin copolymer;
   between 10% and 60% by weight of ethylene vinyl acetate,
   between 20% and 30% by weight of expanded and crosslinked ethylene vinyl acetate discard; and
   from 20% to 60% by weight of powdered rubber.

2. The composition, according to claim 1, further comprising up to 15% by weight of a polyolefin elastomer.

3. An injectable polymeric composition comprising:
   from 3% to 20% by weight of ethylene alpha-olefin copolymer;
   from 10% to 30% by weight of ethylene vinyl acetate;
   between 20% and 30% by weight of expanded and crosslinked ethylene vinyl acetate discard; and
   from 20% to 60% by weight of powdered rubber.

4. The composition, according to claim 3, wherein the ethylene vinyl acetate comprises ethylene vinyl acetate having a content of VA below 20% and ethylene vinyl acetate having a VA content above 25%.

5. The composition, according to claim 4, comprising from 10% to 30% of ethylene vinyl acetate having a VA content of 19% and from 10% to 30% of ethylene vinyl acetate with of VA of 28%.

6. The composition, according to claim 4, further comprising up to 2% by weight of a flow aid and up to 2% by weight of a homogenizing agent.

7. The composition, according to claim 1, wherein the ethylene vinyl acetate comprises ethylene vinyl acetate having a content of VA below 20% and ethylene vinyl acetate having a VA content above 25%.

8. The composition, according to claim 7, comprising from 10% to 30% of ethylene vinyl acetate having a VA content of 19% and from 10% to 30% of ethylene vinyl acetate with of VA of 28%.

9. The composition, according to claim 7, further comprising up to 2% by weight of a flow aid and up to 2% by weight of a homogenizing agent.

10. An injectable polymeric composition comprising:
from 3% to 75% by weight of ethylene alpha-olefin copolymer;
between 10% and 60% by weight of ethylene vinyl acetate,
between 20% and 30% by weight of expanded and crosslinked ethylene vinyl acetate discard; and
up to 60% by weight of powdered rubber.

* * * * *